(12) United States Patent
Morrison et al.

(10) Patent No.: US 9,477,269 B2
(45) Date of Patent: Oct. 25, 2016

(54) BOOK-STYLE SLIDING PIVOT HINGE

(71) Applicant: Dell Products, LP, Round Rock, TX (US)

(72) Inventors: John Trevor Morrison, Round Rock, TX (US); Marco Marroquin, Austin, TX (US); Deeder M. Aurongzeb, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 100 days.

(21) Appl. No.: 14/494,331

(22) Filed: Sep. 23, 2014

(65) Prior Publication Data

US 2016/0085271 A1    Mar. 24, 2016

(51) Int. Cl.
*G06F 1/16* (2006.01)
*E05D 3/02* (2006.01)
*E05D 1/04* (2006.01)

(52) U.S. Cl.
CPC ............... *G06F 1/1681* (2013.01); *E05D 3/02* (2013.01); *G06F 1/1616* (2013.01); *G06F 1/1652* (2013.01); *E05D 1/04* (2013.01); *E05Y 2900/606* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,320,113 B2* | 11/2012 | Xiao | ...................... | G06F 1/162 361/679.27 |
| 8,493,730 B2* | 7/2013 | Shim | ..................... | G06F 1/1615 16/321 |
| 8,599,546 B2* | 12/2013 | Nagasaki | .............. | G06F 1/1681 16/322 |
| 8,660,621 B2* | 2/2014 | Masser | ................. | H04M 1/022 455/575.3 |
| 8,971,032 B2* | 3/2015 | Griffin | .................. | G06F 1/1616 345/156 |
| 9,013,864 B2* | 4/2015 | Griffin | ................ | H04M 1/0216 16/382 |
| 9,235,239 B2* | 1/2016 | van Dijk | ............... | G06F 1/1652 |
| 2008/0144265 A1* | 6/2008 | Aoki | ..................... | G06F 1/1601 361/679.04 |
| 2012/0044620 A1* | 2/2012 | Song | ..................... | G06F 1/1616 361/679.01 |
| 2012/0162876 A1* | 6/2012 | Kim | ..................... | H04M 1/0237 361/679.01 |
| 2013/0293444 A1* | 11/2013 | Sano | ..................... | G06F 1/1616 345/1.3 |
| 2015/0378397 A1* | 12/2015 | Park | ...................... | G06F 1/1652 361/679.27 |

* cited by examiner

*Primary Examiner* — Lisa Lea Edmonds
(74) *Attorney, Agent, or Firm* — Prol Intellectual Property Law, PLLC; H. Kenneth Prol

(57) ABSTRACT

An information handling system includes a flexible display screen, first and second display platforms, and a sliding pivot hinge. The sliding pivot hinge has at least two sliding pivot hinge sides, at least one sliding pivot hinge side is in physical communication with the first display platform. The flexible display screen is supported across the first and second display platforms by translation of the first display platform relative to the sliding pivot hinge.

20 Claims, 7 Drawing Sheets

BOOK-STYLE SLIDING PIVOT HINGE

FIELD OF THE DISCLOSURE

The present disclosure generally relates to book-style sliding pivot hinge for an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as clinical healthcare data storage and distribution, financial transaction processing, procurement, stocking and delivery tracking, provision of data services and software, airline reservations, enterprise data storage, or global communications. Information handling systems may include a variety of hardware and software components that may be configured to process, store, and communicate information and may include one or more computer systems, data storage systems, and networking systems. Additionally, information handling systems may have two or more display platforms with one or more display screens to output images. The information handling system can also include hinges to allow the display platforms to transition to different positions.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

Figure 1:
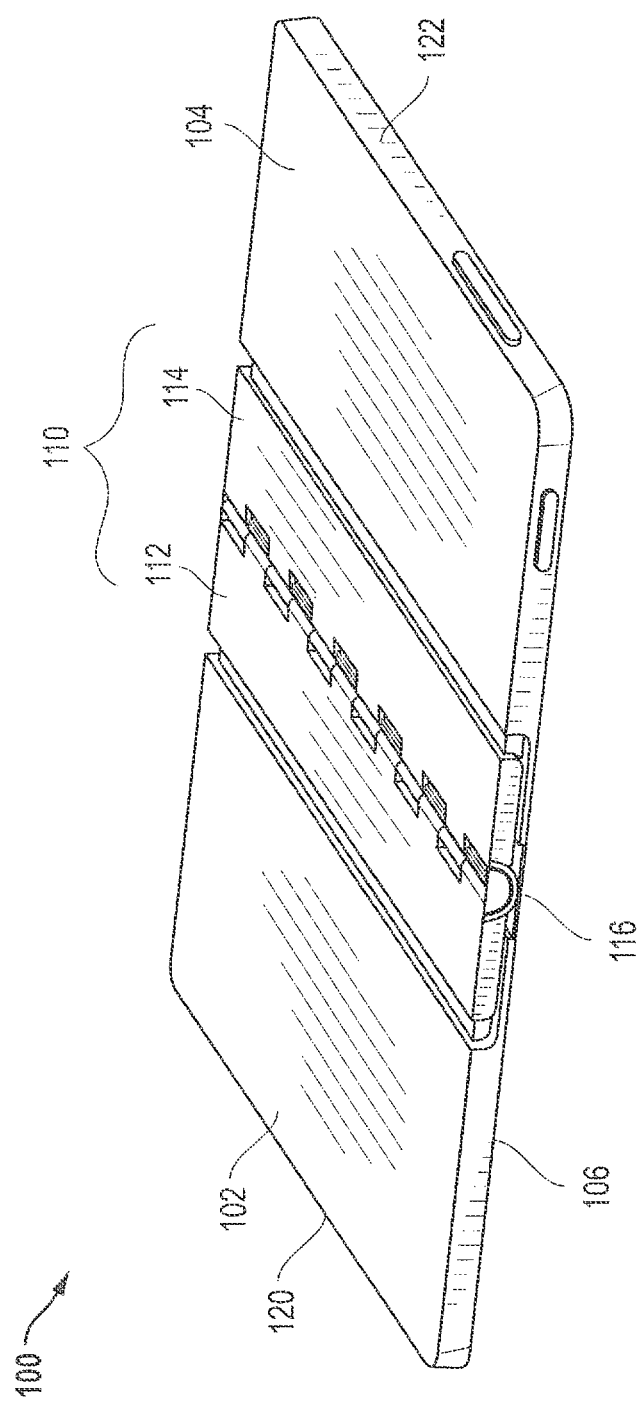
FIG. 1 is a diagram of a information handling system in an open position according to an embodiment of the present disclosure.

The use of the same reference symbols in different drawings indicates similar or identical items. It is understood that the components in the above referenced figures are not necessarily drawn to scale and are often simplified. Variations of components or variation as to connection of components including use of additional components not depicted or using fewer components and features are contemplated.

DETAILED DESCRIPTION OF THE DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Most businesses and other enterprises have sophisticated computing systems used for facilitating internal operations and for storing sensitive data, protecting access to such data, and securely communicating outside the enterprise's network, for example to exchange information with business partners, healthcare providers or the similar data exchange partners. These enterprise systems also interface with individual users. Individual users also use sophisticated computing systems to facilitate working software application contexts such as running office applications for database creation and word processing, note taking, accessing internet data applications, gaming, video playback entertainment, video and voice communications, email and other electronic communication, websurfing, music, mobile applications, and other media accesses. Much of present day information exchange is conducted electronically, via communications networks. Currently, a high degree of media entertainment and other applications are utilized and accessed electronically by users. Thus, there is an increased need for extended display capabilities to facilitate broad range of usage including to enable multitasking by users. Additionally, traditional information handling system input devices such as keyboards and mouse systems are giving way to visual input interfaces such as touchscreens, hover detection, and motion sensing technologies. In many instances, it is substantially beneficial to implement a system with multiple display platforms having one or more display screens configurable in many orientations to interact with an information handling system.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Multiple display platform information handling systems may be configurable in a plurality of orientations for utilization of and interaction with the information handling system. Hereinafter, the terms dual display screen information handling system or dual display information handling systems, or dual display platform information handling system each may refer to devices with a single display screen such as a flexible display that is layered over or mounted on all or part of two or more display platforms, or each may refer to devices with two or more fully integrated display screens, or each may refer to devices with a plurality of separate display screens that are modularly connectable to the information handling system or to one another. The terms screen or display screen may also refer to a portion of a single display screen, such as a flexible display screen, with a plurality of portions or to an individual display screen. Screens or display screens may herein refer to portions of a display screen and may be mounted on or integrated into one or more display platforms. It is understood that while two display platforms are disclosed in several embodiments herein, embodiments including a plurality of display platforms including three or more display platforms in hinged relationship is also contemplated for the systems and methods disclosed herein. One of ordinary skill would understand implementing the systems and method embodiments discussed herein for these additional embodiments.

FIGS. 1-6 show an information handling system including two hinged display platforms, a flexible display screen, flexible display screen interfaces, and sliding pivot hinges. In an embodiment, the flexible display screen may be able to slide or otherwise move with respect to one or both of the display platforms via slip material, such as a layer of a flexible display screen interface, between the flexible display screen and the each of the display platforms. When the information handling system is in an open position, the display platforms are substantially inline with each other. The sliding pivot hinge or hinges allow up to 360 degree rotation of the first and second display platforms with respect to one another. In some embodiments however, full 360 degree rotation of the display platforms may be undesirable if such rotation could cause damage to components such as a single flexible display screen that spans both display platforms. In other embodiments, full rotation may be desired to provide full range of configurations about the axis of rotation of the hinged end. Pivot hinges, continuous hinges, T-hinges, butt hinges, offset hinges, knife hinges or other similar types of hinge structures known in the art for use with electronic devices are contemplated herein as well.

In an embodiment, the sides of the sliding pivot hinges are comprised of interlocking rigid material as is used with a hinge. Additionally one or more pivot pins or pivot bars may be intervening between the pivot hinge sides such that the interlocking pivot hinge sides interlock with the pivot pin or pivot pins in an embodiment. The sliding pivot hinge has two sides that interlock around an axis of rotation to form the hinge. In that the embodiment with one or more pivot pins, the sliding pivot hinge may have an axis of rotation that is adjustable via the intervening pivot pins.

A hinge lock may be used such as a ratchet-type lock or spring-assisted lock for holding the hinge at a given orientation to permit the information handling system to be held in one or more desired open configurations. The sliding pivot hinge can be locked in a straight line or other orientation and can provide support to the flexible display screen while the information handling system is in the open position. Each side of the sliding pivot hinges is located along a hinged end the display platforms and each of the sliding pivot hinges may be attached to a display platform. One or more sides of the sliding pivot hinge may have a sliding attachment to a display platform. Either or both display platforms may be attached via the sliding attachment. The sliding attachment or attachments allow the display platforms shear movement or translation relative to the hinge and the other display platform. The sliding pivot hinge side or sides with sliding capability may be mounted on a track or embedded in a slot of the information handling system display platform to establish a sliding attachment in one embodiment. Other sliding attachments are contemplated. For example, the information handling system display platform may be mounted via a track or mounting pin paired to a slot in the sliding pivot hinge side or sides. The shear movement may be within the mounting track, mounting slots, or similar structures to allow sliding movement while preventing disconnection of the sliding pivot hinge side from the display platform.

The display platform translation of one or both display platforms causes adjustment of the display platform relative to the flexible display screen or screens that may be supported by the display platform. As the information handling system is moved between configurations, the display platforms may adjust and prevent wrinkling or lifting of the display screen relative to the display platforms. That is, some amount of lifting or wrinkling may still be possible, but the embodiments herein minimize this during reconfiguration of the information handling system.

In an embodiment, each of the sliding pivot hinge sides may include a tensioner, such as a spring embedded in one or both sides of the sliding pivot hinge to provide shear force on the attached display platforms. It is understood a plurality of tensioners may be used to exert a more consistent shear force along the hinge end of the display platform. A tensioner is a spring or compressible material with spring-like qualities that may be deformed and exert force to return to its original shape. A variety of springs are contemplated including use of torsion springs, wire form springs, metal stamped or machined springs, or other springs of a variety of shapes, sizes, or materials. The exerted shear force may be designed to put tension to push the attached display platform outward to the full extent of the length of the flexible display screen. Thus, the information handling system may be urged to a dual tablet mode open position where both display platforms are side by side and the hinge is open in a range of approximately 160-200 degrees. In a partially folded position of any sort, such as a book, laptop, or tent orientation, or in a closed position, the sliding pivot hinge with the tensioner will be under increased tension. The system may be held in a closed or single tablet orientation via magnets located in the display platforms or the flexible display to exert a force to hold the display platforms of the information handling system closed. A mechanical latch or other attachment mechanism may be used to hold the information handling system closed although the tensioners are under tension. In another embodiment, a hinge lock as described above may be used to hold the display platforms in any orientation.

The opposite exertion of shear force on the display platforms is contemplated in other embodiments. For example, in a double-tablet orientation the tensioner may exert an inward or pulling shear force toward the sliding pivot hinge such that the display platforms is urged to a folded or closed position. Shear force by the tensioner in either direction may be biased to cause the dual display platform device to close to one side instead of the other. For example, the device may be biased to close such that the flexible display screen is outside of the display platforms rather than to fold the flexible display screen internal to the two display platforms. Nonetheless, it is contemplated that a full 360 degrees or nearly 360 degrees of hinge axis of orientation be available for numerous configurations.

While the information handling system is in the closed position, opening the information handling system display platforms can automatically cause the display platforms to snap open to a predefined open orientation from the closed position when the tensioners apply an outward shear force on the display platforms. In an embodiment, as the display platforms transition from the closed position to the open position, the flexible display screen slides along the one or both of display platforms and the sliding pivot hinge. A flexible magnetic track may be disposed as part of a flexible screen interface between the flexible display screen and the sliding pivot hinge or display platform or platforms. The flexible magnetic track may be magnetically attracted to a ferric metal layer on the flexible display screen or attached thereto to prevent or minimize wrinkling, lifting, or creep of the flexible display screen during orientation reconfigurations. Again, some lifting or wrinkling is possible during reconfiguration, but the flexible display screen may still be considered to be in substantial communication with the display platform and sliding pivot hinge.

FIG. 1 shows an embodiment of a dual display platform information handling system 100 with two hinged display platforms according to an embodiment of the present disclosure. In this embodiment, the information handling system 100 includes display platforms 102 and 104, a flexible display screen 106, sliding pivot hinge 110 with sliding pivot hinge sides 112 and 114, and pivot pin 116. In an embodiment, display platforms 102 and 104 may include housings to contain underlying electronics and power components of the information handling system 100. Accordingly for the described embodiment, housings may be used interchangeably with display platforms. For example, one housing may contain battery and power components while the other housing may contain processors, memory, controllers and other electronics. Different embodiments may house some power and some electronics in any combination between the housings of the two display platforms. In an embodiment, the flexible display screen 106, such as a flexible active-matrix organic LED (AMOLED) display, may be movably mounted on display platforms 102 and 104. In other words, mounted flexible display screen 106 may be able to slide or otherwise move with respect to one or both of the display platforms 102 and 104. The flexible display screen may be fixedly attached to one or more face surfaces of the display platforms 102 and 104 at one or multiple locations of the display platforms 102 and 104. In one embodiment, the display screen may be fixedly attached to one or both display platform surfaces proximate to the display platform edges 120 and 122. In an alternative embodiment, one or more display platforms may embed the flexible display screen 106 and allow it to slide along the display platform with no fixed attachment.

As illustrated in FIG. 1, the information handling system 100 is in a landscape page orientation, or an open, double-tablet position, and the display platforms 102 and 104 are substantially inline with each other. The information handling system 100 is face-down to show detail of the sliding pivot hinge 110. Display platforms 102 and 104 are slidably connected to sliding pivot hinge sides 112 and 114. In this illustrated embodiment, the sliding pivot hinge sides 112 and 114 slide with respect to display platforms 102 and 104 to allow the display platforms 102 and 104 to slide to a widest expanse in the present embodiment when the information handling system is fully open. The sliding pivot hinge sides 112 and 114 may slide inwardly when information handling system 100 is transitioned to a closed position with flexible display screen 106 folded around the outside of the device. This sliding movement allows the flexible display screen 106 to lie flat across and minimize lift or wrinkle over the display platforms 102 and 104 and sliding pivot hinge 110 in various configurations.

In other embodiments, sliding pivot hinge sides 112 and 114 may be arranged in an opposite relation to display platforms 102 and 104 and flexible display screen 106. For example, the sliding sides 112 and 114 may be on the side of the display platforms 102 and 104 that supports display screen 106. In yet another embodiment, flexible display screen 106 may fold to be internal between the display platforms 102 and 104, for example, in a book mode orientation. In that embodiment, the sliding pivot hinge sides 112 and 114 may slide opposite when the information handing system 100 folds the flexible display screen inwardly. Other example embodiments of orientation and relation of the flexible display screen 106, sliding pivot hinge 110, and display platforms 102 and 104 are also contemplated.

In an embodiment the sliding pivot hinge 110 is made from a durable material, such as steel, aluminum, or the like. The durable material of the sliding pivot hinge 110 plus a tensioner (not shown) associated with hinge sides 112 or 114 can enable the display platforms 102 and 104 to be held with tension. Further discussion of the tensioner will be below. Additionally, a hinge lock (not shown) may be used to hold the information handling system 100 in a variety of orientations. The sliding pivot hinge 110 allows the display platforms 102 and 104 to be placed in a closed position as will be discussed in greater detail below.

While the information handling system 100 is in the open position, the sliding pivot hinge 110 can align the display platforms 102 and 104 with each other and can provide support to the flexible display screen 106 without lifting or wrinkling. The display platforms 102 and 104, the flexible display screen 106, and the sliding pivot hinge 110 are interconnected to provide support to the display screen.

Figure 2:
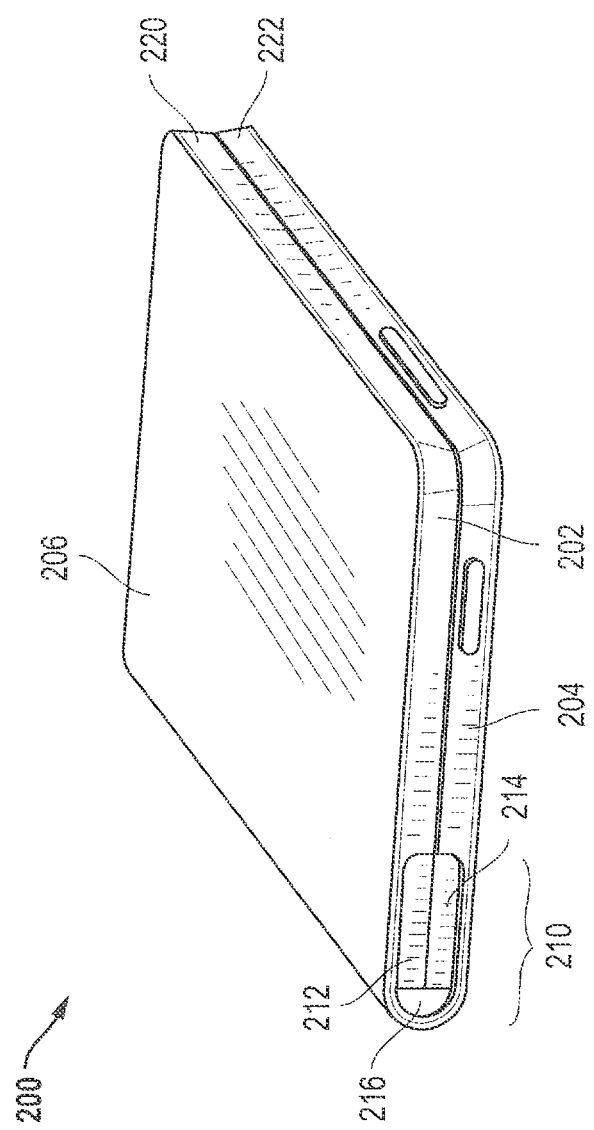
FIG. 2 is a diagram of a information handling system in a closed position according to another embodiment of the present disclosure.

FIG. 2 shows an embodiment of a dual display platform information handling system 100 with two hinged display platforms according to an embodiment of the present disclosure. In this embodiment, the information handling system is shown in a closed position or single tablet orientation if the information handling system 200 is on. The information handling system 200 includes display platforms 202 and 204, a flexible display screen 206, sliding pivot hinge 210 with sliding pivot hinge sides 212 and 214, and pivot pin 216 as similar to the embodiment of FIG. 1. In an embodiment, display platforms 202 and 204 may include housings to contain underlying electronics and power components of the information handling system 200. Accordingly for the described embodiment, housings may be used interchangeably with display platforms.

In an embodiment, the flexible display screen 206, such as a flexible active-matrix organic LED (AMOLED) display, may be movably mounted on display platforms 202 and 204. In other words, mounted flexible display screen 206 may be able to slide or otherwise move with respect to one or both of the display platforms 202 and 204. A magnetic track or other interface layer (not shown) may be located between flexible display screen 206 and the display platforms 202 and 204 and sliding pivot hinge 210. This magnetic track or other interface may assist in keeping the flexible display screen 206 in contact with surfaces of the display platforms 202 and 204 and across the sliding pivot hinge. Further detail is described below. The information handling system 200 may further include slide material that is located between the display platforms 202 and 204 and the flexible display screen 206. In an embodiment, the slide material can be metal pieces, ball bearings, or any other type of material that can reduce the friction between the display platforms 202 and 204 and the flexible display screen 206 while the flexible display screen slides along the display platforms.

As in FIG. 1, the flexible display screen 206 may be fixedly attached to one or more face surfaces of the display platforms 202 and 204 at one or multiple locations. In one embodiment, the display screen may be fixedly attached to one or both display platform surfaces proximate to the display platform edges 220 and 222. In the example embodiment, the display platform edges 220 and 220 are closed and proximate to one another. In an alternative embodiment, one or more display platforms 202 and 204 may embed the flexible display screen 206 and allow it to slide along the display platform with no fixed attachment.

Closing magnets or a ferric structure susceptible to magnetic pull (not shown) may be internal to either or both of the display platforms 202 and 204 may assist in holding the information handling system in the closed or single tablet orientation. As the display platforms 202 and 204 approach the closed position one or more closing magnets can attract the closing magnet(s) or ferric structure in the other display platform to cause the display platforms to properly align. In this embodiment, the closing magnets can have enough attractive force between the pairs of magnets or magnet-ferric structure pair to hold the display platforms 202 and 204 together in the closed position, including under tension from tensioners.

As illustrated in FIG. 2, the information handling system 100 is in a folded, closed or single tablet orientation. The display platforms 102 and 104 are substantially overlaid and aligned with each other. In this illustrated embodiment, the sliding pivot hinge sides 212 and 214 slide with respect to display platforms 202 and 204 and are compressed to allow the display platforms 202 and 204 to slide to a narrowest expanse relative to the sliding pivot hinge 210. In the present embodiment, the flexible display screen 206 wraps around the outside of the information handling system 200, including the sliding pivot hinge 210. This sliding movement of the sliding pivot hinge 210 allows the flexible display screen 206 to lie flat across and maintain substantial physical communication with the display platforms 202 and 204 and sliding pivot hinge 210 in a closed or single tablet configurations. This minimizes lift or wrinkle of the flexible display screen.

Figure 3A:
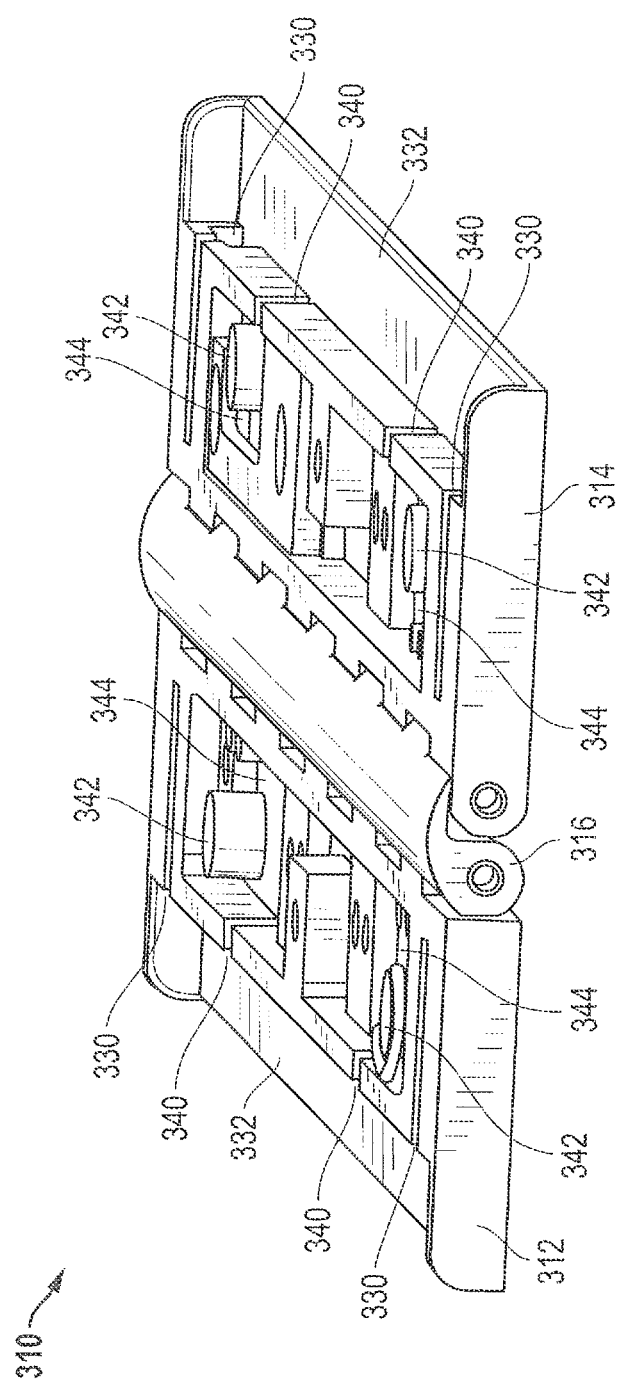
FIG. 3A is a diagram of a sliding pivot hinge detail without display platforms of the information handling system in an open position according to another embodiment of the present disclosure.

FIG. 3A illustrates a view of the sliding pivot hinge 310. In this embodiment, the sliding pivot hinge 310 includes sliding pivot hinge sides 312 and 314, and pivot pin 316. Additional pivot pin structures are also contemplated to provide additional flexibility in opening and closing the information handling system. Internal detail of an embodiment of sliding pivot hinge 310 is shown. Additional data and power communication connections between the display platforms is contemplated including near field communication between display platforms.

Slots 330 and tray 332 may receive the display platforms of the information handling system. Data and power communication lines may be run on top of the pivot pin 316 between the pivot pin 316 and a flexible display screen in the present embodiment. Slots 330 correspond to a guide track or guide post that attached to or integrated as a part of the body of the display platforms for slidable attachment to the display platform. In an embodiment, slots 330 and corresponding guide tracks or guide posts may be a T-shape to provide lateral stability during sliding movement while still providing attachment between the display platforms and sliding pivot hinge 310. Tray 332 may receive the body of the display platform to allow sliding attachment with the display platform. Additional locations and configurations for slots 330 and tray 332 to receive the display platforms are alternatively contemplated.

In an embodiment, aperture 340 corresponds to an additional spring engagement guide track or guide post of the display platform received at the sliding pivot hinge side 312 or 314. Aperture 340 opens to cavity 344 internal to the sliding pivot hinge sides and having posts 342 in an example embodiment. Posts 342 in the present embodiment may support an attached tensioner such as a torsion spring. The additional spring engagement guide track or guide post of the display platform may slide into or out of aperture 340 and cavity 344 and engage part of the tensioner such as a torsion spring mounted on post 342. This will cause the mounted torsion spring to exert outward force on the additional spring engagement guide track or guide post of the display platform in the present embodiment. It is understood that aperture 340, cavity 344, post 342 and tensioner may be configured differently to apply inward force in other embodiments. Additionally, aperture 340, cavity 344 and post 342 may be altered to accommodate a different type of tensioner besides a torsion spring.

Figure 3B:
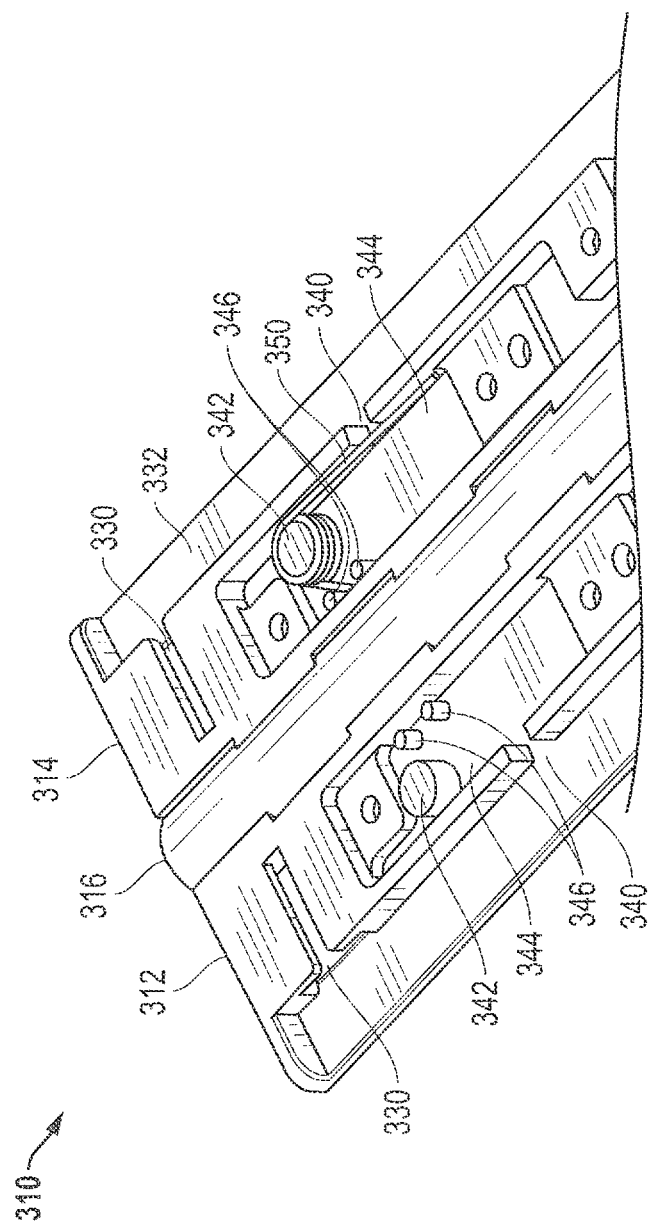
FIG. 3B is another diagram of a sliding pivot hinge detail of the information handling system according to an embodiment of the present disclosure.

FIG. 3B illustrates another view of the sliding pivot hinge 310. In this embodiment, the sliding pivot hinge 310 includes sliding pivot hinge sides 312 and 314, and pivot pin 316. Slots 330 and tray 332 may receive the display platforms of the information handling system. Data and power communication lines may be run on top of the pivot pin 316 between the pivot pin 316 and a flexible display screen in the present embodiment. As described with respect to FIG. 3A, slots 330 correspond to a guide track or guide post attached to or integrated as a part of the body of the display platforms for slidable attachment to the display platform. In the disclosed embodiment, slots 330 and corresponding guide tracks or guide posts are a T-shape to provide lateral stability during sliding movement while still providing attachment between the display platforms and sliding pivot hinge 310. However, other slot and guide shapes are contemplated, for example one or more L-shaped slots and corresponding guide structures on the display platform. Tray 332 may receive the body of the display platform to allow sliding attachment with the platform. Additional locations and configurations for slots 330 and tray 332 to receive the display platforms are alternatively contemplated.

In an embodiment as disclosed, aperture 340 corresponds to an additional tensioner engagement guide track or guide post of the display platform received at the sliding pivot hinge side 312 or 314. Aperture 340 opens to cavity 344 internal to the sliding pivot hinge sides. In the disclosed embodiment, posts 342 and 346 are shown to support an attached tensioner 350. In the present embodiment, the tensioner 350 is a spring such as a torsion spring. The additional guide track or guide post of the display platform may slide into or out of aperture 340 and cavity 344 and engage part of a tensioner 350. Tensioner 350 will exert outward force on the additional guide track or guide post of the display platform in the present embodiment. It is understood that the configuration of aperture 340, cavity 344, post 342, and tensioner 350 may be configured differently to apply inward or a pull force in other embodiments. Additionally, aperture 340, cavity 344 and post 342 may be altered to accommodate a different type of tensioner 350 besides a torsion spring.

Figure 4:
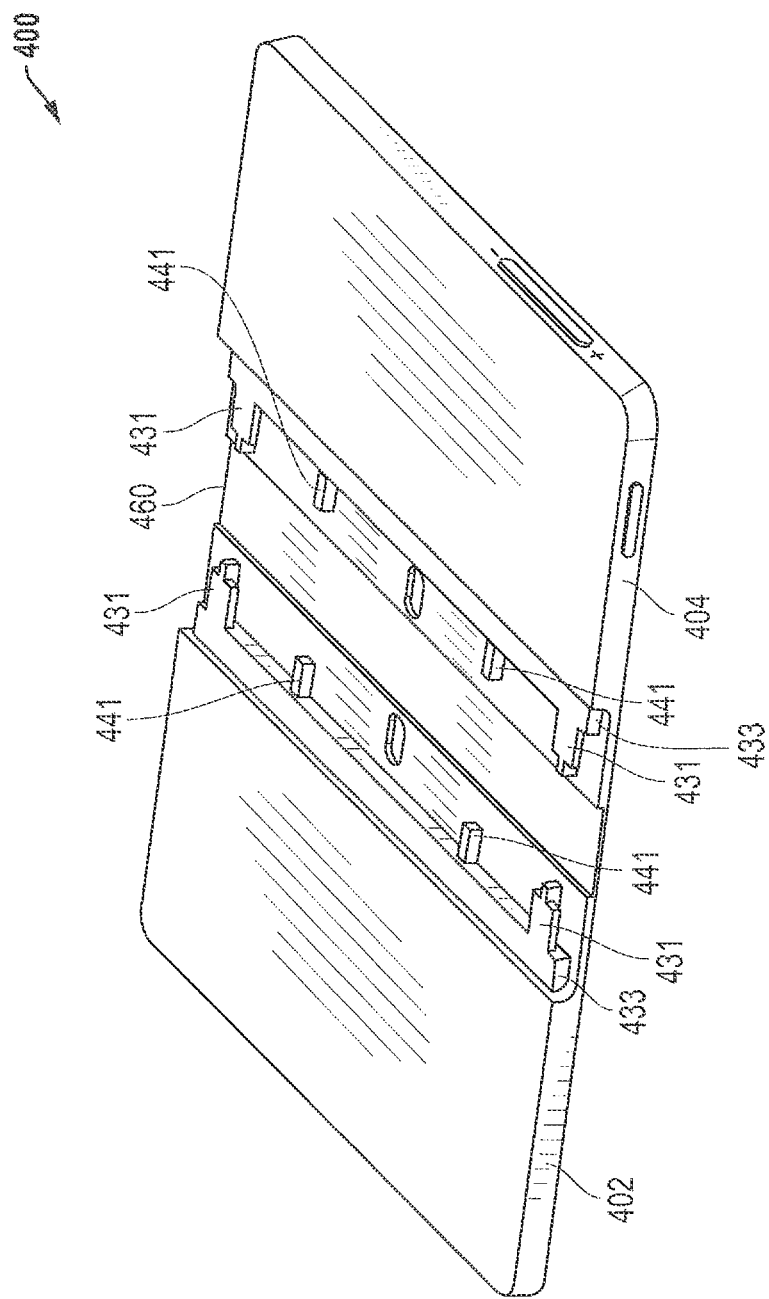
FIG. 4 is a diagram of a the information handling system with no sliding pivot hinge attached according to an embodiment of the present disclosure.

FIG. 4 shows an embodiment of a dual display platform information handling system 400 with two hinged display platforms 402 and 404. Guide tracks 431 are shown in additional detail on display platforms 402 and 404. These guide tracks are T-shaped according to an embodiment of the present disclosure. In another embodiment, guide tracks 431 lock into the display platforms 402 and 404 while still permitting sliding of the pivot hinge with respect to the display platforms 402 and 404. Other structural shapes are available as well for guide tracks 431 to slidably attach the display platforms 402 and 404 to a sliding pivot hinge such as 310. Guide tracks 431 slidingly fit into slots 330 shown in FIG. 3. In another embodiment, one or more additional spring engagement guide tracks 441 are formed in the display platforms 402 and 404. Alternatively, a spring engagement guide post or other sufficient structure may be attached to display platforms 402 and 404. Spring engagement guide tracks 441, or spring engagement posts, slidingly fit into aperture 340 as described above. Spring engagement guide tracks 441 engage tensioner 350 such as a torsion spring inside cavity 344 within the sliding pivot hinge 310. Shelf 433 is received by tray 331 in sides 312 or 314 of the sliding pivot hinge 310.

In an embodiment, a flexible screen interface surface 460 is shown which may attach the display platforms 402 and 404. The flexible screen interface surface 460 may provide structure to support a flexible display screen and include layers to reduce friction upon sliding of the flexible display screen during configuration changes. The flexible screen interface surface 460 may also be a structure with a plurality of layers or a single layer and include a magnetic tracks, discussed further below, to magnetically attach to a ferric coating or other ferric structure on the flexible display screen to keep the flexible display screen substantially in contact with the display platforms 402 and 404 and any sliding pivot hinge. Alternatively or additionally, in an embodiment flexible screen interface surface 460 may include slide material that can be metal pieces, ball bearings, or any other type of material that can reduce the friction between the display platforms 402 and 404 and the flexible display screen while the flexible display screen slides along the display platforms. In yet another embodiment, flexible screen interface surface 460 may not be used and instead the flexible display screen may couple display platforms 402 and 404.

Figure 5:
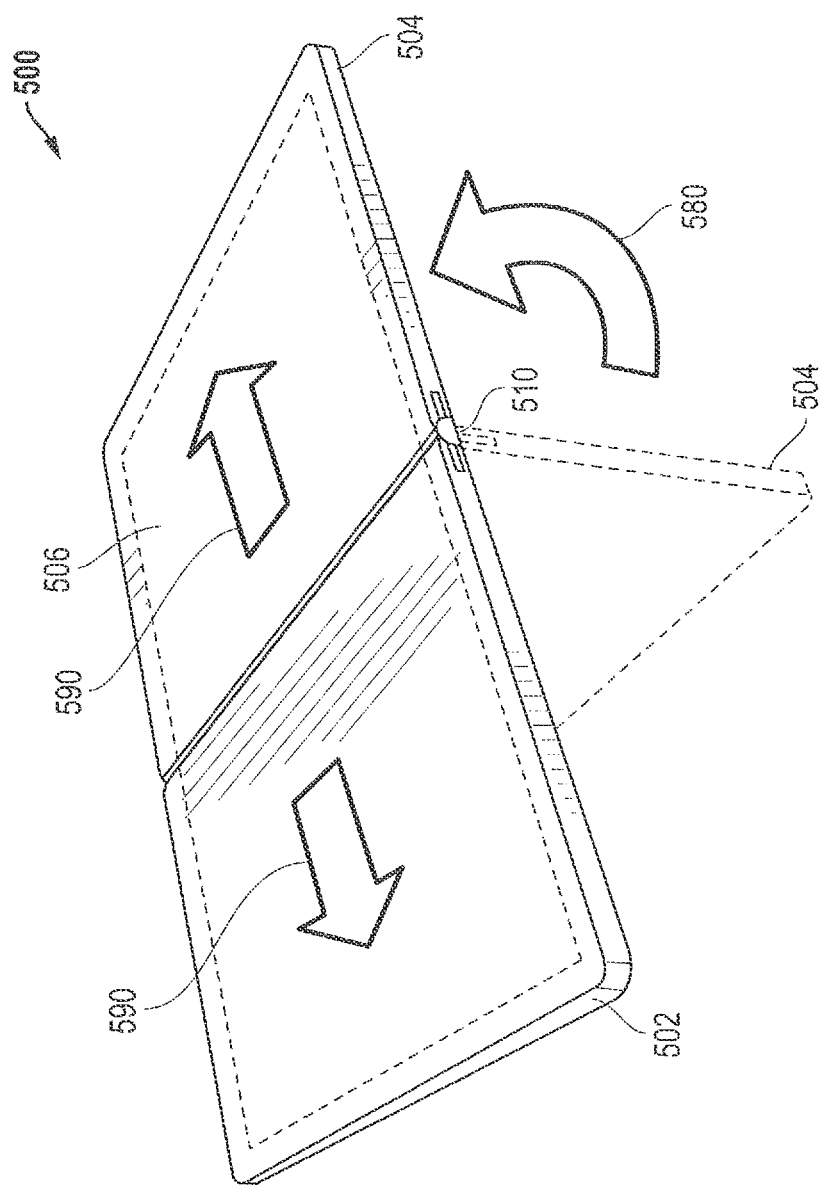
FIG. 5 is a diagram of an information handling system according to another embodiment of the present disclosure.

FIG. 5 illustrates the information handling system 500 transitioning between a more closed position and an open position. FIG. 5 also illustrates the force exerted on the display platforms. The direction of transition 580 of the information handling system 500 from a more the closed position to an open position is shown. Force is applied to the display platforms 502 and 504 in a first direction, such as in a direction to cause surfaces of the display platforms away from overlapping one another. When the strength of the force overcomes the magnets for closed mode or the hinge lock is released, the tensioner 350 exerts force 590 on the display platforms 502 and 504 to automatically cause the display platforms 502 and 504 to open from the closed position shown in FIG. 2 to the open position of FIG. 1. Tension on the sliding pivot hinge is transferred to the display platforms 502 and 504, which in turn will apply outward force 590 to the display platforms and stretch the flexible display screen 506 to avoid wrinkling or lifting. This will also enable the display platforms 502 and 504 to move from the closed position to an open position without additional force. In some embodiments, a hinge locking mechanism such as a hinge lock may be used to cause the information handling system 500 to stop at preset configurations that may be often used or desirable. Alternatively, a travel limiting device may be used as a hinge locking mechanism. The travel limiting structure stops the information handling system 500 at certain orientations by halting the sliding of the display platforms 502 and 504 relative to the sliding pivot hinge axis of rotation. This may hold the display platforms at one or more angles corresponding to a variety of orientations.

The information handling system 500 also includes a hinge locking mechanism (not shown) for the sliding pivot hinge 510. The hinge locking mechanism may be connected to the display platforms 502 and 504 in another embodiment. In an embodiment, the hinge locking mechanism can be a ratchet device that can have multiple locking positions to hold display platforms at different angles in between the closed or single tablet position, fully open double tablet position or a laptop position or book mode position beyond 180 degrees. The hinge locking mechanism can have a push/pull to release locking a component as described below. A first locking position of the hinge locking mechanism can be in the open double tablet position of the display platforms 502 and 504. In this embodiment, the hinge locking mechanism can be unlocked by an individual pushing/pulling the display platforms 502 and 504 slightly in a first direction that is opposite of the direction of the closed position, and then the hinge locking mechanism can be released to freely rotate in the direction of the closed position. When the hinge locking mechanism is unlocked, the display platforms 502 and 504 may automatically transition from the open double tablet position to the next position. In an example embodiment, the next open position is a laptop or book mode orientation.

The hinge locking mechanism can be unlocked from the laptop or book mode position by an individual pushing/pulling the display platforms 502 and 504 slightly past the laptop or book mode position. Then the hinge locking mechanism can be released to freely permit the sliding pivot hinge to rotate in the direction of the open double tablet position. The tensioner in the sliding pivot hinge can cause the display platforms 502 and 504 to automatically transition from the laptop or book mode position to the open double tablet position in response to the display platforms no longer being locked in the laptop or book mode position.

Figure 6:
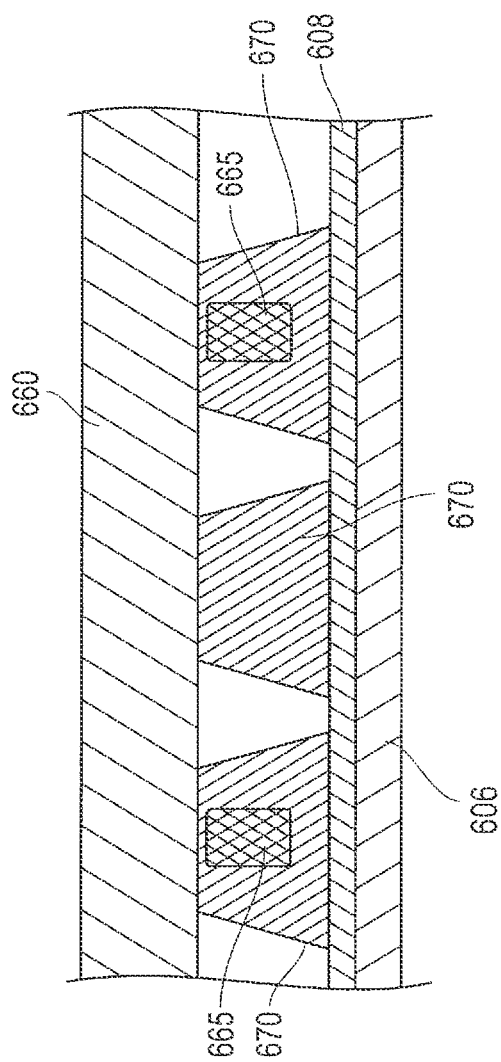
FIG. 6 is a diagram of a flexible screen interface for an information handling system according to an embodiment of the present disclosure.

FIG. 6 shows an embodiment of a flexible screen interface 600 including a plurality of layered structures similar to that described above for the flexible screen interface surface 460. The flexible screen interface 600 of the presently disclosed embodiment shows a flexible display screen 606 that may slide relative to the flexible screen interface 600. The flexible display screen 606 has a protective layer 608 in an example embodiment for engagement with the flexible screen interface 600. In an example embodiment, the protective layer 608 has a metallic or ferric component. The flexible screen interface 600 includes a flexible layer 660 for attachment and interface with the display platforms or the sliding pivot hinge components of the information handlings systems described above. The flexible screen interface 600 further includes small magnets 665 embedded in the flexible substrate associated with flexible layer 660 in an example embodiment. The small magnets interact with ferric, flexible layer 660. As a result, the flexible screen interface 600 may maintain contact between the display platforms and a flexible display. In another embodiment, flexible layer 660 may include embedded small magnets 665 within protrusions or projections 670 from the flexible layer some of which may contain the small magnets. In another embodiment, flexible substrate ridges or other structures containing one or more magnets or magnetic bars may protrude from flexible layer 660 to engage with protective layer 608 of the flexible display screen 606.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a flexible display screen;
   first and second display platforms, the flexible display screen movably mounted to the first and second display platforms; and
   a sliding pivot hinge with at least two sliding pivot hinge sides; and
   at least one sliding pivot hinge side in physical communication with the first display platform and which slides in relation to the first display platform;
   a tensioner to apply constant tension on the first display platform relative to the sliding pivot hinge wherein the tensioner is a constant tension spring integrated into the at least one hinge side of the sliding pivot hinge,
   wherein the flexible display screen is supported across the first and second display platforms by translation of the first display platform relative to the sliding pivot hinge.

2. The information handling system of claim 1, further comprising:
   a second sliding pivot hinge side in physical communication with the second display platform and which slides in relation to the second display platform.

3. The information handling system of claim 2, wherein the first display platform and the second display platform both translate relative to the sliding pivot hinge during change in configuration of the information handling system.

4. The information handling system of claim 1, further comprising:
   a flexible display interface to maintain the first and second display platform and the sliding pivot hinge in communication with the flexible display screen.

5. The information handling system of claim 4, wherein the flexible display interface includes a magnet in magnetic communication with a ferric metal layer of the flexible display screen.

6. The information handling system of claim 1, further comprising:
   a second tensioner to apply constant tension on the second display platform relative to the sliding pivot hinge.

7. The information handling system of claim 1, further comprising:
   a hinge locking mechanism to maintain the information handling system in at least one configuration position.

8. An information handling system comprising:
   a flexible display screen;
   first and second display platforms, the flexible display screen movably mounted to the first and second display platforms; and
   a sliding pivot hinge with at least two sliding pivot hinge sides;
   at least one sliding pivot hinge side in physical communication with the first display platform and which slides relative to the first display platform; and
   a flexible display interface to maintain the first and second display platform and the sliding pivot hinge in communication with the flexible display screen, wherein the flexible display interface includes a flexible magnetic track in magnetic communication with a ferric metal layer of the flexible display screen.

9. The information handling system of claim 8, further comprising:
   a pivot pin disposed between the at least two sliding pivot hinge sides.

10. The information handling system of claim 8, further comprising:
    a tensioner to apply constant tension on the first display platform relative to the sliding pivot hinge.

11. The information handling system of claim 8 further comprising:
    a tensioner to apply constant tension on the first display platform relative to the sliding pivot hinge wherein the tensioner is a constant tension spring.

12. The information handling system of claim 11, wherein the flexible magnetic track exerts magnetic force to maintain magnetic communication between the flexible display screen and the flexible magnetic track after change in configuration of the first and second display platforms relative to one another.

13. The information handling system of claim 12, wherein the at least one sliding pivot hinge side slides along the first display platform in response to first and second display platforms moving from an open position to a closed position.

14. The information handling system of claim 8, wherein the flexible display interface includes a magnet embedded in a flexible substrate proximate to the sliding pivot hinge.

15. An information handling system comprising:
    a flexible display screen;
    first and second display platforms, the flexible display screen movably mounted to the first and second display platforms; and
    a sliding pivot hinge with at least two sliding pivot hinge sides;
    at least one sliding pivot hinge side in physical communication with the first display platform and which slides in relation to the first display platform; and
    a tensioner to apply constant tension on the first display platform relative to the sliding pivot hinge; and
    a hinge locking mechanism to maintain the information handling system in at least one configuration position, wherein the flexible display screen is supported across the first and second display platforms by translation of the first display platform relative to the sliding pivot hinge.

16. The information handling system of claim 15, further comprising:
a second sliding pivot hinge side in physical communication with the second display platform and which slides in relation to the second display platform.

17. The information handling system of claim 16, further comprising:
a second tensioner to apply constant tension on the second display platform relative to the sliding pivot hinge.

18. The information handling system of claim 17, wherein the first and second tensioners exert a shear force on the first and second display platforms to push the first and second display platforms to an open position relative to one another.

19. The information handling system of claim 17, wherein the first and second tensioners exert a shear force on the first and second display platforms to pull the first and second display platforms to an closed position relative to one another.

20. The information handling system of claim 15, wherein the tensioner exerts a shear force on the first display platforms to push the first display platforms to an open position relative to the second display platform.

\* \* \* \* \*